US008709523B2

(12) United States Patent
Hoffman et al.

(10) Patent No.: US 8,709,523 B2
(45) Date of Patent: Apr. 29, 2014

(54) FOOD-GRADE FLOUR FROM DRY FRACTIONATED CORN GERM AND COLLET COMPOSITION AND METHOD FOR PRODUCING SAME

(75) Inventors: David P. Hoffman, LeMars, IA (US); Kimberly Jean Sitzmann, LeMars, IA (US); Joseph John Furgal, Winnipeg (CA); Scott Paul Hoffman, Merrill, IA (US)

(73) Assignee: David P. Hoffman, LeMars, IA (US)

( * ) Notice: Subject to any disclaimer, the term of this patent is extended or adjusted under 35 U.S.C. 154(b) by 112 days.

(21) Appl. No.: 13/485,377

(22) Filed: May 31, 2012

(65) Prior Publication Data

US 2013/0136845 A1    May 30, 2013

Related U.S. Application Data

(63) Continuation-in-part of application No. 13/284,840, filed on Oct. 28, 2011.

(60) Provisional application No. 61/408,708, filed on Nov. 1, 2010.

(51) Int. Cl.
*A21D 2/00* (2006.01)

(52) U.S. Cl.
USPC ............................ 426/622; 426/417; 426/618

(58) Field of Classification Search
CPC ......... A21D 13/04; A21D 2/36; A21D 2/364; A21D 2/366; A21D 6/001; A23L 1/2142
USPC ......................................................... 426/622
See application file for complete search history.

(56) References Cited

U.S. PATENT DOCUMENTS

| 4,495,207 | A | 1/1985 | Christianson |
| 7,419,108 | B2 | 9/2008 | Foster |
| 2008/0260902 | A1 | 10/2008 | Van Houten |
| 2009/0311397 | A1 | 12/2009 | Whalen |

OTHER PUBLICATIONS

Sanful, Rita E., Nutritional and Sensory Analysis of Soya Bean and Wheat Flour Composite Cake, Pakistan Journal of Nutrition 9 (8): 794-796, 2010. ISSN 1680-5194.

Reitmeier, C. A., Addition of Dry- and Wet-Milled Corn Germ Flours to Model System Frankfurters of Three Fat Levels, Journal of Food Quality 13, 283-293, 1990.

(Continued)

*Primary Examiner* — Patricia George
(74) *Attorney, Agent, or Firm* — Brick Gentry PC; Brian J. Laurenzo; Jessica L. Susie

(57) ABSTRACT

A nutrient rich food-grade defatted corn germ flour derived from a dry-milled corn germ fraction is provided. The flour produced contains high levels of protein, dietary fiber, and amino acids and is low in fat. Furthermore, a method for preparing the flour by forming collets and removing oil from the dry-milled corn germ fraction is provided. The method includes: providing a dry-milled corn germ fraction; conditioning the fraction; flaking the fraction to increase surface area; adding water and steam to the flaked fraction; forming the flaked fraction into collets; removing oil from the collets by solvent-extraction; drying the collets; and processing the collets in a food-grade flourmill to obtain food-grade defatted corn germ flour with a desired consistency. The solvent-extraction process produces a miscella, a mixture of corn oil, hydrocarbon solvent, and water. The miscella may be processed through a distillation system to recover crude food-grade corn oil.

21 Claims, 2 Drawing Sheets

(56) References Cited

OTHER PUBLICATIONS

Lucisano, M., Use of Defatted Corn Germ Flour in Pasta Products, Journal of Food Science 49: 482-484, 1984.

Tsen, C. C., Defatted Corn-Germ Flour as Nutrient Fortifier for Bread, Cereal Chemistry 51 (2): 262-271, 1974.

Blessin, C. W., Composition of Three Food Products Containing Defatted Corn Germ Flour, Journal of Food Science 38: 602-606, 1973.

Canolty, Nancy L., Relative Protein Value of Defatted Corn Germ Flour, Journal of Food Science 42: 269-270, 1977.

Barbieri, R., Production of a Food Grade Flour from Defatted Corn Germ Meal, Journal of Food Technology 18:35-41, 1983.

FOOD-GRADE FLOUR FROM DRY FRACTIONATED CORN GERM AND COLLET COMPOSITION AND METHOD FOR PRODUCING SAME

PRIOR APPLICATION INFORMATION

This application is a continuation-in-part of U.S. Nonprovisional patent application Ser. No. 13/284,840, filed on Oct. 28, 2011, which claims the benefit of U.S. Provisional Patent Application No. 61/408,708, filed Nov. 1, 2010.

FIELD OF THE INVENTION

The invention relates generally to grain processing. More particularly, the invention relates to a Food-Grade Defatted Corn Germ Flour and a Collet Composition and method for producing same.

BACKGROUND OF THE INVENTION

Effective processing of corn germ into both food and feed grade products can enhance the long-term viability of the corn ethanol industry and can prove to be a lucrative business opportunity in itself. Defatted corn germ flour is a byproduct of the corn oil industry that is typically used as an ingredient in animal feed. The problem in developing corn germ as a protein-rich product for human consumption relates to the deterioration of the corn germ during extended periods of storage. Such deterioration is caused by conventional pressing methods and solvent extraction methods that leave lipids in the corn germ flour that enzymatically oxidize into compounds that contribute a bitter flavor.

The term "corn germ" is used throughout this application to refer to "dry fractionated corn germ" as opposed to another distinctly different product "wet-milled corn germ" or "wet fractionated germ".

The corn kernel is comprised of a number of components, each having a different nutritional composition and commercial use. The major parts of the corn kernel are the pericarp/tip cap, germ, and endosperm. The pericarp/tip cap is high in fiber, while the germ has a high protein and oil content. The endosperm contains most of the starch. The corn germ, representing 11% of the corn kernel by weight, contains the genetic information for the seedling as well as enzymes, vitamins and minerals. The composition of the corn germ is approximately 33% oil, 18% protein, and 18% fiber with the balance being sugar, starch, and ash.

Two basic methods are employed in processing corn kernels. The processes are known as "wet-milling" and "dry-milling." Wet-milling is a method by which the corn kernel is separated into starch, germ, fiber, and gluten by steeping the corn kernel in a solution prior to grinding and centrifugation to separate the components of the corn kernel. The solution in which the corn kernel is steeped generally contains sulfur dioxide and enzymes, such as lactic acid. Such solution renders the corn flour obtained from the wet-milled corn kernel inadequate for human consumption. As such, corn flour obtained from wet-milling is typically used in animal feed. Lucisano et al. [J. Food Sci. 49:482-484 (1984)] states that wet-milling produces a product that is unsuitable for human consumption as corn germs are modified during steeping. However, the study also states that the dry-milling process provides a product that is adequate for human consumption.

Dry-milling is a process in which the entire corn kernel is cleaned, and then water is added to increase the moisture content. The corn kernel is tempered to allow the moisture to spread throughout the grain. The moisture allows the germ to toughen for easy removal. In the dry-milling process, the germ is removed from the endosperm early. The remaining parts of the corn kernel are ground and sieved into various fractions.

The majority of corn in the United States is used whole, either as animal feed or is fed into ethanol plants. However, individual components of the corn kernel provide far greater value than used as a whole. As such, fractions have been separated by wet and dry corn millers, and an increasing number of ethanol plants are contemplating installing fractionation processes to take out the bran and germ prior to processing the corn for fermentation.

Although the amount of corn germ extracted has increased, there is a shortage of plants to process the corn germ into food-grade oil and meal. Such shortage is due to the absence of a method by which food-grade oil and meal can be efficiently and affordably produced. Currently, 450 to 800 tons of corn germ is obtained from various suppliers each day. More suppliers are projected to arise as existing dry mill ethanol facilities consider installing a technology called Dry Corn Fractionation. There are on the order of 200 corn ethanol plants in the US with a combined ethanol production capacity on the order of 13 billion gallons per year. These plants consume some 4.8 billion bushels of corn per year. These 4.8 billion bushels contain 8-10% readily extractable corn germ through the use of dry fractionation processes. Total quantity of extractable corn germ is on the order of 12 million tons per year, an amount that is more than adequate to supply a substantial sized corn germ processing industry. Such a supply has the potential for being processed into a great deal of food-grade corn oil and flour if an efficient method for producing food-grade defatted corn germ flour is determined.

Through the process for obtaining food-grade corn germ flour from dry fractionated corn germ, crude food-grade corn oil is also obtained. Corn oil is in high demand due to increasing consumer preference for oils without trans fats. It is the second most produced vegetable oil in the United States and is considered "healthy oil", with no cholesterol. While the supply of dry fractionated corn germ has increased, the production of food-grade corn oil has not increased as methods for producing food-grade corn oil have proven to be slow and costly. Thus, there is a need for a process that can produce food-grade corn oil in a manner that is cost effective and efficient.

A process for increasing corn oil extraction is provided in Published Patent Application No. US 2008/0260902 A1. The patent application teaches a process for utilizing the entire corn kernel to produce corn oil. As a result of the process a de-oiled corn meal is obtained. The extracted corn oil is used to make nutritionally enhanced food-grade corn oil, lubricants, biodiesel, and fuel among other products as stated in the patent application. The corn meal obtained from the process, however, may be useful in producing animal feed rations, snack food, cosmetics, and fermentation broth additive among other products. The patent application focuses on teaching a method for maximizing corn oil extraction from corn kernels as opposed to producing a nutrient rich corn flour for human consumption. Furthermore, the patent application does not teach a nutrient rich food-grade defatted corn germ flour comprising an amino acid profile reaching recommended nutritional values.

Feed-grade defatted corn germ meal, typically obtained from a wet-milling process, is currently sold as animal feed with a valuable protein and mineral composition that has a number of advantages for local livestock producers, particularly hog and dairy producers. Due to the protein and mineral composition of the defatted corn germ meal, it can replace up to 55% of a hog's diet. Using a defatted corn germ meal value of 100% of corn price and replacing 30% of the diet for a market hog would result in a feed cost savings of $6.30 to $28 per ton of feed and an incremental profit of between $5 and $8 per market hog. For the average pork producer feeding 6,000 head per year, that equates to a savings of $30,000 per year. Great nutritional and economic benefits have been observed from feeding corn germ meal to animals. Similarly, defatted corn germ meal, a high protein product, has promise as a human food ingredient.

For food-grade corn germ flour, defatted corn germ meal is ground into fine flour with the use of a 200-mesh screen. This product is not being produced on a commercial scale because the oil is too expensive and slow to extract from the corn germ according to dry fractionation. Thus, on the commercial scale, wet-milling typically processes defatted corn germ. Wet-milling efficiently produces food-grade corn oil but results in a feed-grade defatted corn germ flour due to the addition of enzymes, which render the product inadequate for human consumption.

Addition of defatted corn germ flour enhances the nutritional value of diets, especially when added to bakery goods. A study regarding the composition of three food products containing defatted corn germ flour, Blessin et al. [J. Food Sci. 38:602-606 (1973)], taught that by adding defatted corn germ flour to cookies and muffins, starch content is decreased and protein content is increased. As to the third food product, beef patties, there was very little nutritional impact by adding defatted corn germ flour. Tsen et al. [Cereal Chem. 51:262-271 (1974)], further supported the finding in Blessin that adding defatted corn germ flour to bakery goods provides nutritional fortification. Tsen taught that acceptable bread could be prepared from wheat flour fortified with 12% defatted corn germ flour. Thus, both studies found that bakery goods of various types can be fortified with enough defatted corn germ flour as to ensure nutritive improvement and is a simple modification that can be easily incorporated to enhance the diet of individuals.

Due to the significant nutritional value of defatted corn germ flour, it can be an appropriate addition to the diet of third-world countries. By adding one cup of defatted corn germ flour to two cups of a starch product, such as rice, an undernourished population can receive full, recommended, nutritional intake. Furthermore, defatted corn germ flour may also be utilized in middle-eastern diets as the corn germ flour produced is Kosher. In addition to nutritional considerations, the functional properties of defatted corn germ flour, such as emulsifying properties, foaming capacity and stability, water and oil absorption and solubility also contribute significantly to the final quality of a processed food product.

In the art of producing food-grade defatted corn germ flour, little success has been achieved in using a solvent-extraction method for producing food-grade defatted corn germ flour on a commercial scale due to lack of efficiency, economics, and quality of product. Producing a food-grade product by defatting dry-milled corn germ with carbon dioxide under supercritical conditions is taught by U.S. Pat. No. 4,495,207. The invention teaches an alternative method to producing food-grade corn germ flour as conventional pressing methods and solvent extraction methods using hydrocarbons have been found to yield an unpalatable product due to enzymatic oxidation of lipids remaining in the corn germ meal subsequent to extraction.

In addition to concerns regarding the enzymatic oxidation of residual lipids, solvent-extraction methods have also posed concerns on the nutritional and functional quality of proteins in the defatted corn germ meal. Barbieri et al. [J. Food Tech. 18:35-41 (1983)] teaches that conditioning the corn kernel prior to removing the corn germ and conditioning the flaked corn germ prior to solvent-extraction substantially decreased protein solubility, while protein digestibility remained substantially constant.

In light of the forgoing prior art, it is evident that an efficient and cost effective method for producing food grade defatted corn germ flour would be greatly beneficial to improve individuals' diets, as the positive nutritional benefits of defatted corn germ meal are well established. Production of defatted corn germ flour on a commercial scale can prove to be beneficial for individuals seeking to add greater nutrients to their diet. If produced efficiently, the affordability of the defatted corn germ meal would provide a great cost to nutrition ratio, especially for undernourished individuals in third-world countries.

SUMMARY OF THE INVENTION

According to a first aspect of the invention, a nutrient rich food-grade defatted corn germ flour derived from a dry-milled corn germ fraction is provided. The food-grade defatted corn germ flour produced contains high levels of protein, dietary fiber, and amino acids and is low in fat. It is an object of the invention to provide a method for producing a nutrition rich food-grade defatted corn germ flour and food-grade oil from a dry fractionated corn germ by producing a collet from the corn germ fraction, from which oil is removed to produce corn germ meal. In the preferred embodiment the method for producing food-grade defatted corn germ flour comprises the steps of: (a) warming and conditioning a quantity of corn germs; (b) flaking the corn germ; (c) adding water and steam to flaked corn germ prior to collet formation; (d) forming collets; (e) extracting oil from the collets using a hydrocarbon solvent; (f) desolventizing the corn germ meal; and (g) processing the corn germ meal in a food-grade flourmill to a desired particle size to produce food-grade flour for human consumption. Miscella, a mixture of oil and hydrocarbon solvent, recovered during the extraction process is processed through a three-stage distillation system to produce crude food-grade oil.

According to a second aspect of the invention, it has been discovered that processing the corn germ to form collets prior to introducing a solvent wash during extraction prevents degradation of the corn germ. The formation of collets allows lipids to be effectively removed from the corn germ meal. As a result, high quality, food-grade flour is produced.

DETAILED DESCRIPTION OF THE INVENTION

Figure 1:
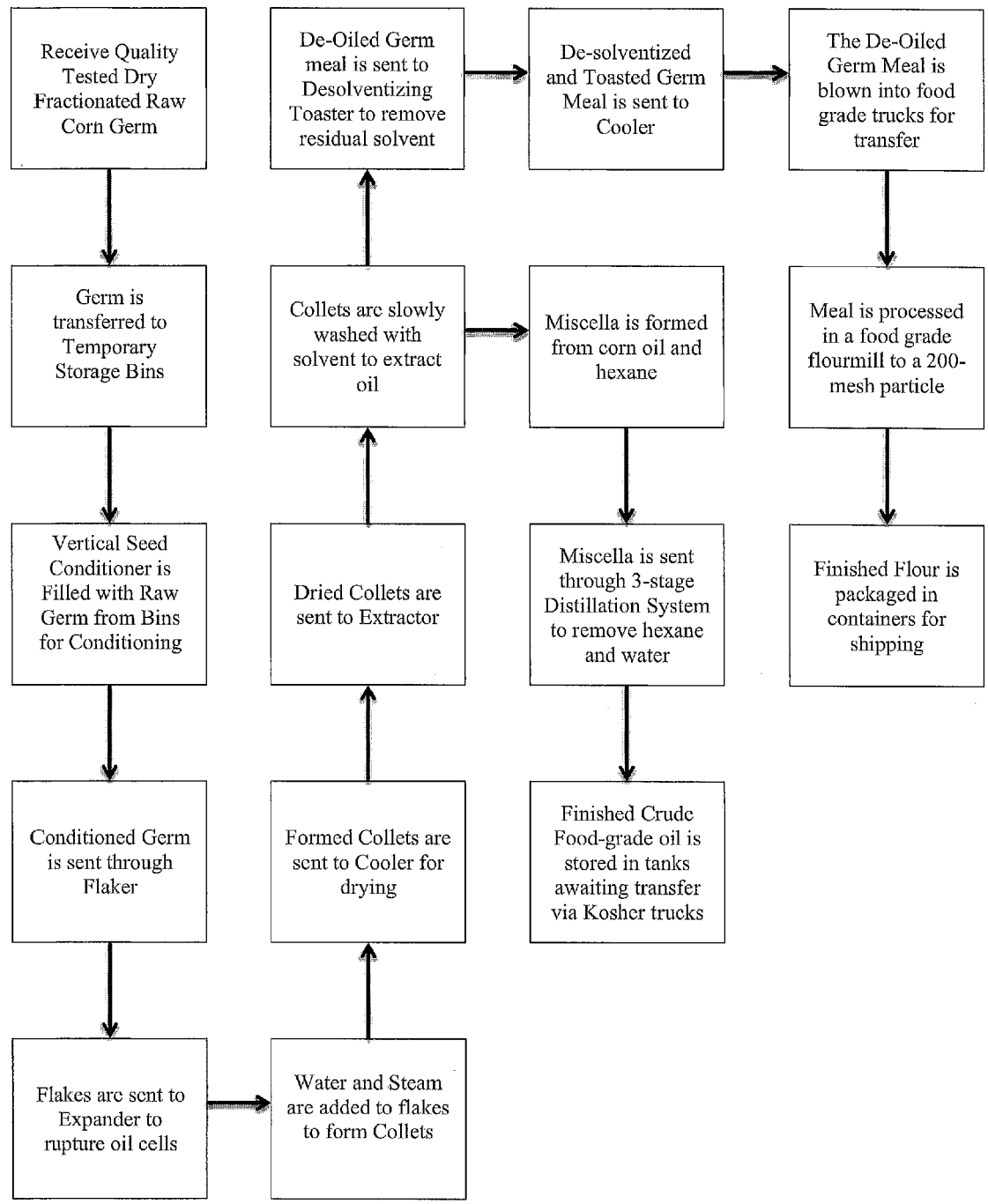
FIG. 1 shows a flowchart for the method for producing food-grade flour from dry fractionated corn germ.

FIG. 1 shows a process flowchart, encompassing the steps involved in producing food-grade defatted corn germ flour from dry fractionated corn germ as described in the present invention.

The starting material contemplated for use in the invention includes quality tested raw corn germ fractions obtained from a conventional dry milling process. The moisture content of the expected corn germ ranges from 9-18%. In addition to moisture content, fat, protein, starch, neutral detergent fiber (NDF), and ash content are expected to be as follows: 18-22% fat/oil, 13.9-15.7% protein, 22.3-32.6% starch, 28% NDF, and 5.2-6.3% ash. For purposes of enhancing extraction efficacy, it is preferred to first flake the corn germ and form collets.

In preparation for flaking, the quality tested corn germ is delivered and placed in storage bins, which are conveyed into a preparation room. A vertical seed conditioner is filled with the raw corn germ, where the raw corn germ is warmed and conditioned with steam. Subsequently, the conditioned corn germ is transferred to a flaker. The flaking step increases the exposed surface area of the corn germ and ruptures some of the oil "cells," releasing the oil for easier extraction. The flaked corn germ is conveyed to an expander where it is mixed with water and steam and then forced through a die at high pressure and heat where it is shaped into porous collets. Addition of water and steam is crucial to the integrity of the collet. An appropriate mixture of starch and water is imperative for collet binding. As such, the starch content and water added during collet formation must be monitored carefully. In the preferred embodiment, the water added to the flaked corn germ is at ambient temperature and the steam pressure is between 35 pounds per square inch and 80 pounds per square inch. Furthermore, in the preferred embodiment, with a corn germ running rate of 155 tons per day water is added into the expander at a rate less than 1 gallon per minute. The size of the die used in the expander will vary depending on the desired size of collets. In the preferred embodiment, the desired collet size is 3/8 inch by 3/8 inch, thus a 3/8 inch die would be used. Additionally, in the preferred embodiment, the pressure applied would be between 50 pounds per square inch and 80 pounds per square inch. Furthermore, in the preferred embodiment, the temperature applied to the flaked corn germ during collet formation would be between 225 degrees Fahrenheit and 275 degrees Fahrenheit.

By forming collets, greater surface area of the corn germ is exposed, allowing effective lipid extraction. Proper collet formation is essential to the success of producing food-grade defatted corn germ flour by dry-milling. Prior attempts to produce food-grade corn germ flour by dry-milling were unsuccessful due to the difficulty in effectively extracting oil from the corn germ. The present invention processes corn germs into collets prior to extraction to better facilitate removing oil from the corn germ. Increasing surface area of the corn germ brings the oil contained in the corn germ to the surface, allowing the solvent used in extraction to more easily remove the oil. Furthermore, the increased exposed surface area will ensure that any residual solvent is removed during the desolventizing-toaster step. Thus, proper formation of the collets is crucial to the success of the dry-milling process described herein to yield a high-protein, food-grade defatted corn germ flour.

Figure 2:
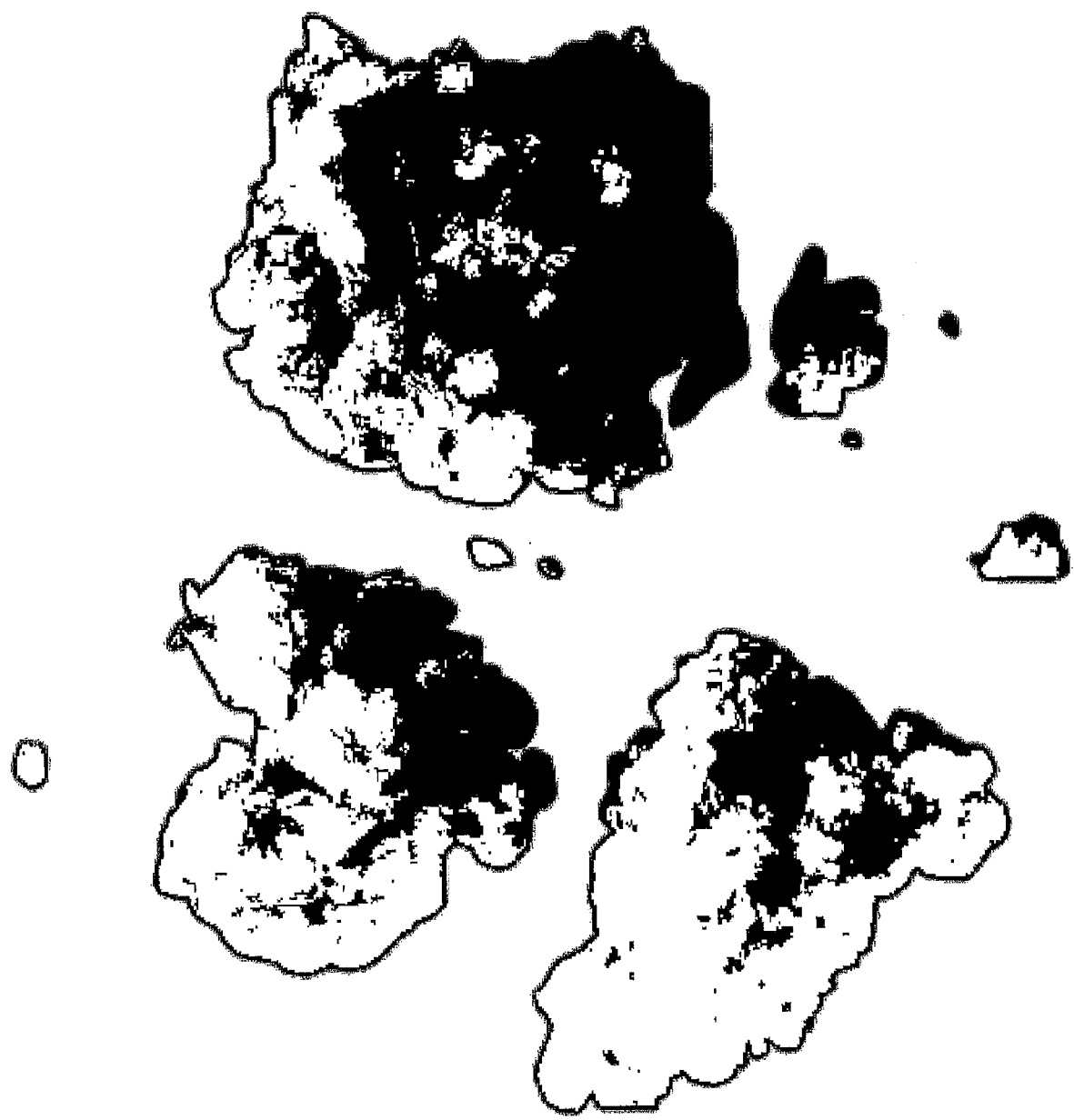
FIG. 2 is a perspective view of the collets formed from dry fractionated corn germ in the present invention.

The size of collets can vary from 1/4 inch by 1/4 inch to 1 inch by 18 inches and have a porous irregular shaped nugget appearance. The shape of the collets may be observed in FIG. 2. In the preferred embodiment, the dimensions of the collets should be 3/8 inch by 3/8 inch. The composition of collets is characterized in terms of moisture, protein, fat/oil, starch, and NDF content. The collets, generally, will have the following composition by weight: 12-17% moisture, 15-26% fat/oil, 12-18% protein, 25-35% starch, and 25-35% NDF. However, in addition to varying dimensions of the collets, the composition will also vary. The composition of the collets is affected by the composition of the original corn germ utilized to form the collets. Corn naturally varies in composition and thus yields collets of varying composition. For example, composite germ will yield a collet with the following composition by weigh: 15% moisture, 22% fat/oil, 14-16% protein, 30% starch, and 28% NDF. Alternatively, composite bran will have the following composition by weight: 14.5% moisture, 3.0% fat/oil, 8-9% protein, 34% starch, and 47-54% NDF. Likewise, the composition of collets produced from composite endosperm varies from that of the germ and bran discussed above. The collets of composite endosperm will have the following composition by weight: 15% moisture, 2.00% fat/oil, 7.5-8.0% protein, 80-82% starch, and 5-5.8% NDF. In the preferred embodiment, the composition by weight of collets would be as follows: 7-20% moisture, 10-28% fat/oil, 8-35% protein, 5-50% starch, and 2-30% NDF.

Prior to extraction, the collets go through a dryer-cooler to reduce the moisture content. While in the dryer-cooler, the collets are monitored every two hours to ensure proper moisture content of the collets is achieved for extraction. Subsequently, the dried collets are conveyed into an extractor where they are washed with a hydrocarbon solvent. In the preferred embodiment, the hydrocarbon solvent used would be hexane. At 150 tons per day, hexane would be applied at a rate of 80 gallons per minute in the preferred embodiment. Additionally, in the preferred embodiment, the retention time for the collets in the extractor would be between 40 minutes and 60 minutes. The solvent dissolves the corn oil and makes miscella, a mixture of corn oil and solvent. Extraction of oil from the collets yields a corn germ meal that can be further processed to produce high quality, food-grade defatted corn germ flour. Furthermore, the oil extracted can be processed to produce crude, food-grade oil.

The collets remain in the extractor until the oil content of the corn germ meal is reduced to approximately 1-3%, from its original content of 10-28% fat/oil. Following extraction the corn germ meal is conveyed to a desolventizer-toaster where any residual solvent is removed to prevent enzymatic oxidation of any lipid remaining in the corn germ meal. The desolventizer-toaster consists of a five-tray system, which heats the corn germ meal to a maximum temperature of 250 degrees Fahrenheit. The corn germ meal is housed in the desolventizer-toaster for approximately two hours, where it is periodically monitored to ensure complete desolventization.

The miscella obtained from extraction is sent through a three-stage distillation system. Miscella is a mixture of oil extracted from the collets and the hydrocarbon solvent used in the extraction process. The distillation system separates the hydrocarbon solvent and water from the extracted corn oil. The resulting crude, food-grade corn oil is stored in a tank awaiting transfer via Kosher trucks.

Upon completion of extraction, the resulting defatted corn germ meal is sent to a cooler. The cooler maintains an average temperature between 70 to 80 degrees Fahrenheit. The corn germ meal is housed in the cooler for approximately 90 minutes. The defatted corn germ meal recovered from the cooler is dry and very fragile. The corn germ meal is readily milled to a fine, highly dispersible flour having utility in products for human consumption.

As such, the corn germ meal is blown from the cooler to a temporary hopper bin, from where it is loaded into food-grade trucks for transfer to a food-grade flourmill. Alternatively, the corn germ meal may be blown directly from the cooler into a food-grade truck for transfer to a food-grade flourmill. The latter option alleviates any concerns for contamination during storage. Subsequently, the defatted corn germ meal may be processed in a food-grade flourmill to obtain a desired consistency. The mesh size used in the food-grade flourmill determines the consistency of the resulting defatted corn germ flour. As such, the mesh size may be modified to produce a more fine or course textured flour. In the preferred embodiment the defatted corn germ meal is processed in a food-grade flourmill to a 200-mesh particle. Alternatively, the corn germ meal may be utilized without processing in a food-grade flourmill if a more course consistency is desired. For example, defatted corn germ flour added to granola bars would likely be utilized with more course texture and would not need to be processed to a finer particle size in a flourmill. Alternatively, a fine texture would be desired for defatted corn germ flour being used as an additive in soups. As such, the defatted corn germ would likely be processed to a 300-mesh particle size in a flourmill in order to be used as an additive in soup.

The resulting defatted corn germ flour would have a very well balanced set of essential amino acids that exceeds most recommended values for human consumption. Furthermore, the resulting defatted corn germ flour would typically have the following approximate nutritional composition: 17% protein, 21% dietary fiber, 65% carbohydrates, and 1.5% fat. Thus, defatted corn germ flour is high in protein and dietary fiber, and is naturally high in many minerals. These percentages can vary slightly with the presence of ash or other substances of little or no nutritional value. Furthermore, the reported carbohydrates reflect complex carbohydrates, which are based on a calculation that takes into consideration starch and fiber content. Thus, the presence of ash and other substances, along with reporting carbohydrates as complex carbohydrates can cause slight variation in the reported percentages for the nutritional composition of the defatted corn germ flour. Accordingly, after taking into consideration that the carbohydrates are reported as complex carbohydrates, the typical composition for the resulting defatted corn germ flour would consist of: 7.15% moisture, 66.09% carbohydrates, 4.29% fat, 16.22% protein and 6.25% ash. The defatted corn germ flour contains high quality protein and has a well-balanced essential amino acid profile, as presented in Table 1.

TABLE 1

Essential Amino Acid Profile in Defatted Corn Germ Flour

|  | Corn Germ Flour | Suggested Level for Adults |
|---|---|---|
| Lysine | 6.35% | 5.00% |
| Leucine | 7.8% | 6.70% |
| Valine | 6.15% | 4.60% |
| Isoleucine | 3.80% | 4.00% |
| Threonine | 3.8% | 3.40% |
| Phenylalanine | 5.32% | 3.20% |
| Tyrosine | 2.83% | 3.20% |
| Arginine | 6.22% | 2.00% |
| Methionine | 1.80% | 1.90% |
| Histidine | 3.31% | 1.70% |
| Cystine | 2.14% | 1.30% |
| Tryptophan | 1.86% | 1.10% |

The nutritional benefits of defatted corn germ meal go beyond the well-balanced essential amino acid profile. Table 2 provides the typical mineral analysis for the preferred defatted corn germ meal. Furthermore, the typical vitamin and mineral composition of the defatted corn germ flour is presented and demonstrates that the defatted corn germ flour is particularly high in magnesium, potassium, and phosphorus. Due to natural variance in the starting corn germ fraction, also presented in table 2 is an acceptable range for the vitamin and mineral composition of the defatted corn germ meal.

TABLE 2

Typical Mineral Analysis Results

| Component | As Sent (Range) | As Sent (Preferred) | Dry Wt. |
|---|---|---|---|
| Moisture (%) | 7-18 | 10.29 | — |
| Dry Matter (%) | 82-93 | 89.71 | — |
| Crude Protein (%) | 12-22 | 16.6 | 18.5 |
| Crude Fat (%) | 0.5-5 | 2.70 | 3.01 |
| Acid Detergent Fiber (%) | 4-7 | 5.79 | 6.46 |
| Ash (%) | 5-9 | 6.91 | 7.71 |
| Total digestible nutrients (%) | 57-87 | 72.8 | 81.2 |
| Net energy - lactation (Mcal/lb) | 0.6-0.9 | 0.76 | 0.85 |
| Net energy - maint. (Mcal/lb) | 0.6-0.9 | 0.79 | 0.88 |
| Net energy - gain (Mcal/lb) | 0.4-0.7 | 0.53 | 0.59 |
| Digestible energy (Mcal/lb) | 1-2 | 1.45 | 1.62 |
| Metabolize energy (Mcal/lb) | 1-2 | 1.35 | 1.50 |
| Sulfur (%) | 0.1-0.3 | 0.18 | 0.20 |
| Phosphorus (%) | 1-3 | 1.67 | 1.86 |
| Potassium (%) | 1-3 | 1.84 | 2.05 |
| Magnesium (%) | 0.4-0.7 | 0.58 | 0.65 |
| Calcium (%) | 0.1-0.2 | 0.16 | 0.18 |
| Sodium (%) |  | <0.01 | <0.01 |
| Iron (ppm) | 85-130 | 107 | 119 |
| Manganese (ppm) | 19-30 | 24 | 27 |
| Copper (ppm) | 6-10 | 8 | 9 |
| Zinc (ppm) | 74-112 | 93 | 104 |
| Total Starch (%) | 19-30 | 24.98 | 27.85 |

As compared to whole-wheat flour, defatted corn germ flour is gluten free, 50-100% higher in protein content, up to 85% lower in carbohydrates, 200-300% higher in fiber, 300% higher in phosphorus, lower in fat and cholesterol, and a very good source of natural minerals. Thus, food-grade defatted corn germ flour approaches and exceeds most nutritional values suggested for human consumption. Furthermore, all minerals and vitamins are organic and concentrated due to the fact that they are produced from the germ, which is the unsprouted corn plant embryo. Table 3 presents basic nutritional information for defatted corn germ flour.

TABLE 3

Nutritional Information

| Analysis Performed | Typical Value (%, as is basis) |
|---|---|
| Moisture | 6-9 |
| Protein | 16-20 |
| Dietary Fiber | 18-22 |
| Carbohydrates | 62-68 |
| Fat | 0.5-5 |
| Potassium | 1-3 |
| Phosphorous | 1-3 |
| Magnesium | .5-2 |
| Calcium | .02-.1 |
| Zinc | .01-.1 |

Table 4 presents a more detailed description of the typical composition of the defatted corn germ flour in the preferred embodiment. The composition of the defatted corn germ flour may vary due to the natural variance in the composition of the starting corn germ fraction. As such, the table 4 also provides acceptable ranges for the nutritional composition of the defatted corn germ flour.

TABLE 4

Nutritional Information per 100 grams of Defatted Corn Germ Flour

| Analyte | Preferred Embodiment | Acceptable Range |
|---|---|---|
| Moisture | 7.15 g | 5-14 g |
| Ash | 6.25 g | 5-7.5 g |
| Calories | 367.85 Kcal | 294-442 Kcal |
| Calories from Fat | 36.54 Kcal | 29-44 Kcal |
| Total Fat | 4.29 g | 0.5-5 g |
| Cholesterol | 58.4 mg | 46-70 mg |
| Sodium | <10 mg | |
| Total Carbohydrate Content | 66.09 g | 52-80 g |
| Dietary Fiber | 21.35 g | 17-26 g |
| Sugars | 9.90 g | 7-12 g |
| Glucose | 0.30 g | 0.2-0.4 g |
| Sucrose | 7.40 g | 5-9 g |
| Lactose | <0.2 g | |
| Maltose | 1.90 g | 1-3 g |
| Fructose | 0.30 g | 0.2-0.4 g |
| Protein N x 6.25 | 16.22 g | 12-22 g |
| Phosphorus | 1.46 g | 1-3 g |
| Potassium | 1470 mg | 1100-2000 mg |
| Vitamin A | <80 IU | |
| Vitamin C | <2 mg | |
| Calcium | 10.00 mg | 8-12 mg |
| Iron | 8.639 mg | 6-11 mg |
| Trans Fatty Acids | 0.01 g | 0.005-0.02 g |
| Fat by Fatty Acid Profile | 4.06 g | 3-5 g |
| Fat, Saturated | 0.44 g | .3-.6 g |
| Magnesium | 540.0 mg | 432-648 mg |
| Zinc | 8.910 mg | 7-11 mg |

Defatted corn germ flour provides all the goodness of the grain without the high carbohydrate and fat ladings of other cereal flours such as whole corn, wheat and rice. Due to the high fiber content of the defatted corn germ flour, it has good water binding capacity for moisture management in applications such as baked goods and meats. Furthermore, the defatted corn germ flour has an unusually high level of corn protein that helps maintain a texture and structure in often challenging gluten free formulations. The defatted corn germ flour may be added to food products to enhance nutritional value. Such products include, but are not limited to: tortillas, pizza, gluten-free pasta, gluten free baking mixes, cereals, nutritional bars, snacks, gluten free baked goods, gluten free nutritional bars, nutritional enhancer as an additive to whole wheat flour, and as a binder in meat products. Table 5 provides a comparison of the nutritional value provided from defatted corn germ flour as compared to other commonly consumed flours.

TABLE 5

Nutritional Value Comparison of Grains/Flours

| Product | Protein | Dietary Fiber | Carbs | Fats | Additional Benefits | Possible Negative Attributes |
|---|---|---|---|---|---|---|
| Defatted Corn Germ Flour | 7% | 21% | 65% | 1.5% | Good source of Phosphorus, Potassium, and Magnesium. Gluten Free | |
| Barley Flour | 10% | 11% | 85% | 4% | | |
| Whole Wheat Flour | 13% | 11% | 80% | 5% | | |
| White Wheat Flour | 10% | 2% | 86% | 2% | | |
| Millett Flour | 11% | 8.5% | 70% | 10% | Gluten Free | High in carbohydrates |
| White Rice Flour | 6% | 0.4% | 91% | 3% | Gluten Free | Gritty texture, baked goods tend to be dry and crumbly |
| Brown Rice Flour | 7% | 4% | 76% | 7% | Gluten Free | |
| Potato Flour | 5% | 6% | 94% | 1% | Gluten Free | High in refined carbohydrates and low in nutrients |
| Tapioca Starch | 0% | 0% | 83% | 0% | Gluten Free | Flavorless, high in carbohydrates and low in nutrients |
| Quinoa Flour | 14% | 7% | 67% | 13% | Gluten Free | High in carbohydrates and has strong bitter flavor. |
| Sorghum Flour | 11% | 6% | 80% | 8.5% | Gluten Free | High in carbohydrates |
| Teff Flour | 13% | 13% | 70% | 0% | Gluten Free | High in carbohydrates |
| Masa Corn Flour | 7% | 8% | 84% | 9% | Gluten Free | |
| Defatted Soy Flour | 35% | 10% | 47% | 3% | | Soy is listed in the top 8 food allergens |
| Oat Flour | 14% | 1% | 65% | 20% | | |
| White Corn Flour | 5% | 8% | 86% | 9% | | |

TABLE 5-continued

Nutritional Value Comparison of Grains/Flours

| Product | Protein | Dietary Fiber | Carbs | Fats | Additional Benefits | Possible Negative Attributes |
|---|---|---|---|---|---|---|
| Light Rye Flour | 6% | 11% | 89% | 3% | | |

Although various representative embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps of operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims. Although the present invention has been described with reference to one or more examples of embodiments outlined above, various alternatives, modifications, variations improvements and/or substantial equivalents, whether known or that are or may be presently foreseen, may become apparent to those having at least ordinary skill in the art. Accordingly, the one or more examples of embodiments of the invention, as set forth above, are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A method for preparing food-grade defatted corn germ flour from a dry-milled corn germ fraction comprising the steps of:
   a. providing a raw dry-milled corn germ fraction;
   b. transferring said raw dry-milled corn germ fraction to temporary storage bins;
   c. placing said raw dry-milled corn germ fraction in a vertical seed conditioner;
   d. producing conditioned corn germ by heating and conditioning said raw dry-milled corn germ;
   e. producing a flaked corn germ by processing said conditioned corn germ through a flaker, said flaked corn germ having greater surface area than the conditioned corn germ;
   f. conveying said flaked corn germ to an expander;
   g. producing a moistened corn germ from said flaked corn germ by adding water and steam to said expander, wherein said water is added at ambient temperature at a rate less than 1 gallon per minute with a corn germ running rate of 155 tons per day and said steam is added at a pressure between 35 pounds per square inch and 80 pounds per square inch;
   h. forming collets from said moistened corn germ by forcing said moistened corn germ through a die at high pressure and heat;
   i. conveying said collets to a cooler for drying;
   j. producing miscella and de-oiled collets by transferring said collets to an extractor and washing said collets with a hydrocarbon solvent;
   k. removing residual solvent by transferring said de-oiled collets to a desolventizing-toaster;
   l. sending said de-oiled collets from the desolventizing-toaster to a cooler;
   m. conveying said de-oiled collets from the cooler to a food-grade flourmill; and
   n. producing-food grade defatted corn germ flour by processing said de-oiled collets in the food-grade flourmill.

2. The method as described in claim 1 wherein said food-grade defatted corn germ flour comprises 17% protein, 1.5% oil, 65% carbohydrates and approximately 21% dietary fiber.

3. A method for preparing crude food-grade oil from a dry-milled corn germ fraction comprising the steps of:
   a. providing a raw dry-milled corn germ fraction;
   b. transferring said raw dry-milled corn germ fraction to temporary storage bins;
   c. placing said raw dry-milled corn germ fraction in a vertical seed conditioner;
   d. producing conditioned corn germ by heating and conditioning said raw dry-milled corn germ;
   e. producing a flaked corn germ by processing said conditioned corn germ through a flaker, said flaked corn germ having greater surface area than the conditioned corn germ;
   f. conveying said flaked corn germ to an expander;
   g. producing a moistened corn germ from said flaked corn germ by adding water and steam to said expander, wherein said water is added at ambient temperature at a rate less than 1 gallon per minute with a flaked corn germ running rate of 155 tons per day and said steam is added at a pressure between 35 pounds per square inch and 80 pounds per square inch;
   h. forming collets from said moistened corn germ by forcing said moistened corn germ through a die at high pressure and heat;
   i. conveying said collets to a cooler for drying;
   j. producing miscella by transferring said collets to an extractor and washing said collets with a hydrocarbon solvent; and
   k. producing crude food-grade oil by removing the hydrocarbon solvent and water from said miscella in a distillation system.

4. A method for preparing food-grade defatted corn germ flour from a dry-milled corn germ fraction comprising the steps of:
   a. providing a raw dry-milled corn germ fraction;
   d. producing conditioned corn germ by heating and conditioning said raw dry-milled corn germ;
   c. producing a flaked corn germ by processing said conditioned corn germ through a flaker, said flaked corn germ having greater surface area than the conditioned corn germ;
   d. conveying said flaked corn germ to an expander;

e. producing a moistened corn germ from said flaked corn germ by adding water and steam to said expander, wherein said water is added at ambient temperature at a rate less than 1 gallon per minute with a flaked corn germ running rate of 155 tons per day and said steam is added at a pressure between 35 pounds per square inch and 80 pounds per square inch;
f. forming collets by extruding said moistened corn germ;
g. drying said collets;
h. producing miscella and de-oiled collets by extracting and washing said collets;
i. desolventizing said de-oiled collets;
j. producing food-grade defatted corn germ flour by cooling and milling said de-oiled collets.

5. A method for preparing crude food-grade oil from a dry-milled corn germ fraction comprising the steps of:
a. providing a raw dry-milled corn germ fraction;
b. producing conditioned corn germ by heating and conditioning said raw dry-milled corn germ;
c. processing said conditioned corn germ through a flaker;
d. producing a moistened corn germ from said flaked corn germ by adding water and steam to said expander, wherein said water is added at ambient temperature at a rate less than 1 gallon per minute with a flaked corn germ running rate of 155 tons per day and said steam is added at a pressure between 35 pounds per square inch and 80 pounds per square inch;
e. forming collets by extruding said moistened corn germ;
f. drying said collets;
g. extracting and washing said collets to produce miscella and de-oiled collets; and
h. producing crude food-grade oil by removing the hydrocarbon solvent and water from said miscella in a distillation system, distilling the miscella through a distillation system to remove said hydrocarbon solvent and water to produce crude food-grade oil.

6. A method for preparing crude food-grade defatted corn germ flour from a dry-milled corn germ fraction comprising the steps of:
a. providing a raw dry-milled corn germ fraction;
b. producing conditioned corn germ by heating and conditioning said raw dry-milled corn germ;
c. producing a flaked corn germ by processing said conditioned corn germ through a flaker;
d. producing a moistened corn germ from said flaked corn germ by adding water and steam to an expander, wherein said water is added at ambient temperature at a rate less than 1 gallon per minute with a flaked corn germ running rate of 155 tons per day and said steam is added at a pressure between 35 pounds per square inch and 80 pounds per square inch;
e. forming collets by extruding said moistened corn germ;
f. drying said collets;
g. producing miscella and de-oiled collets by extracting and washing said collets; and
h. desolventizing said de-oiled collets; and
i. producing food-grade defatted corn germ flour by cooling and milling said de-oiled collets.

7. The method of claim 6 wherein said food-grade defatted corn germ flour comprises water, protein, dietary fiber, carbohydrates, oil, amino acids, vitamins, and minerals.

8. The method of claim 6 wherein said food-grade defatted corn germ flour comprises at least 6% water but does not exceed 9% water.

9. The method of claim 6 wherein said food-grade defatted corn germ flour comprises at least 16% protein but does not exceed 20% protein.

10. The method of claim 6 wherein said food-grade defatted corn germ flour comprises at least 18% dietary fiber but does not exceed 22% dietary fiber.

11. The method of claim 6 wherein said food-grade defatted corn germ flour comprises at least 62% carbohydrates but does not exceed 68% carbohydrates.

12. The method of claim 6 wherein said food-grade defatted corn germ flour comprises at least 0.5% oil but does not exceed 5% oil.

13. The method of claim 6 wherein said food-grade defatted corn germ flour comprises the following amino acids: 6.35% lysine, 7.8% leucine, 6.15% valine, 3.80% isoleucine, 3.8% threonine, 5.32% phenylaline, 2.83% tyrosine, 6.22% arginine, 1.88% methionine, 3.31% histidine, 2.14% cysteine, and 1.86% tryptophan.

14. The method of claim 6 wherein said food-grade defatted corn germ flour comprises 17% protein, 1.5% oil, 65% carbohydrates and approximately 21% dietary fiber.

15. The method of claim 6 wherein said collet comprises oil, moisture, starch, protein, and neutral detergent fiber.

16. The method of claim 6 wherein said collet comprises at least 10% oil by weight but does not exceed 28% oil by weight.

17. The method of claim 6 wherein said collet comprises at least 7% moisture by weight but does not exceed 20% moisture by weight.

18. The method of claim 6 wherein said collet comprises at least 5% starch by weight but does not exceed 50% starch by weight.

19. The method of claim 6 wherein said collet comprises at least 8% protein by weight but does not exceed 35% protein by weight.

20. The method of claim 6 wherein said collet comprises at least 2% neutral detergent fiber by weight but does not exceed 30% neutral detergent fiber by weight.

21. The method of claim 6 wherein said raw dry-milled corn germ fraction comprises 9-18% moisture, 18-22% oil, 13.9-15.7% protein, 22.3-32.6% starch, and approximately 28% neutral detergent fiber.

* * * * *